United States Patent
Chen et al.

(10) Patent No.: US 8,099,784 B1
(45) Date of Patent: Jan. 17, 2012

(54) BEHAVIORAL DETECTION BASED ON UNINSTALLER MODIFICATION OR REMOVAL

(75) Inventors: Joseph Chen, Los Angeles, CA (US); Jamie Jooyoung Park, Los Angeles, CA (US)

(73) Assignee: Symantec Corporation, Mountain View, CA (US)

(*) Notice: Subject to any disclaimer, the term of this patent is extended or adjusted under 35 U.S.C. 154(b) by 457 days.

(21) Appl. No.: 12/371,501

(22) Filed: Feb. 13, 2009

(51) Int. Cl.
*G06F 11/00* (2006.01)
(52) U.S. Cl. .......................................... 726/23
(58) Field of Classification Search ............ 726/23
See application file for complete search history.

(56) References Cited

U.S. PATENT DOCUMENTS

| | | | |
|---|---|---|---|
| 7,594,272 B1* | 9/2009 | Kennedy et al. ............... | 726/24 |
| 7,765,592 B2* | 7/2010 | Wang et al. .................... | 726/22 |
| 2005/0268112 A1* | 12/2005 | Wang et al. .................... | 713/188 |
| 2006/0075494 A1* | 4/2006 | Bertman et al. ............... | 726/22 |
| 2006/0075501 A1* | 4/2006 | Thomas et al. ................ | 726/24 |
| 2008/0134330 A1* | 6/2008 | Kapoor et al. ................. | 726/22 |

* cited by examiner

*Primary Examiner* — Kambiz Zand
*Assistant Examiner* — Teshome Hailu
(74) *Attorney, Agent, or Firm* — Fenwick & West LLP

(57) ABSTRACT

To evade heuristic detection, malware is often designed to trick users into installing the malware by being packaged in a standard installer known to the user's computer for typically installing legitimate software. To prevent removal of the malware, the malware modifies or removes its uninstaller. A security module manages this type of evasion technique by monitoring and detecting installations performed on a computer. The module detects attempts to remove or modify the uninstaller for the application to render the uninstaller incapable of uninstalling the application. The module can intercept and block such attempts, and then analyze the application for malicious code. Where the application is determined to be malware, the module prevents malicious activity. The module can also use the malware's own uninstaller to uninstall the malware from the computer.

16 Claims, 5 Drawing Sheets

BEHAVIORAL DETECTION BASED ON UNINSTALLER MODIFICATION OR REMOVAL

BACKGROUND OF THE INVENTION

1. Field of the Invention

This invention pertains in general to computer security, and more specifically to detecting malicious code based on its behavior relating to deletion or modification of its uninstallation module.

2. Description of the Related Art

Computer systems are continually threatened by a risk of attack from malicious computer code, also known as "malware." Malware threats include computer viruses, worms, Trojan horse programs, spyware, adware, crimeware, and phishing web sites. Malicious code can spread through a variety of different routes. For example, malicious code can spread when a user inserts a disk or other infected medium into a computer system. In a network-based attack, malicious code can be transmitted to the computer as an executable program in an attachment to an electronic message. In this case, the malicious code can attack the computer when the user clicks on the attachment, or the attachment might open automatically when the user reads or previews the electronic message. In addition, malware can access and cause damage to a user's computer when a user installs new programs that are infected.

Given all of the different types of malware and mechanisms for gaining access to and infecting computers, a multitude of different detection techniques must be designed and constantly updated to protect computers today. Antivirus or security software on the computer can use techniques such as signature scanning and behavior monitoring heuristics to detect the malware. For example, various types of heuristic detection can be used to detect malware behavior where a user has installed a potentially infected application. Before damage can be done to the user's computer, the malware can be promptly removed or disarmed.

With the many detection techniques instituted regularly, the designers of malware are constantly evolving new methods for eluding detection. For example, malware may be designed to evade heuristic detection and to trick users into installing the malware by being packaged in a standard installer. Since the installer is known to the user's computer for typically installing legitimate software, the malware and its installation package is not detected. One example of such an evasion technique has been seen currently where a malicious executable file gains access to a computer through one of the mechanisms described above (via disk, email, etc.). The executable file stores a downloader (e.g., a VISUAL BASIC® downloader) that downloads an installation package recognized by the computer as a standard installer. Since a standard installer is used for the installation, the user recognizes the installation process as normal and unknowingly agrees to the installation of the malware. Finally, once installed and able to run on the computer, the malware deletes the uninstaller so that the user cannot later uninstall the malware. Other examples of this type of detection evasion are commonly seen, generally having similar features in that a known installer is used to trick the user into installing malware, and the malware then uninstalls or damages the uninstaller to prevent malware removal.

Thus, there is needed a system and method for detecting the installation of these types of malware designed to evade detection using a standard installer, and to remove such malware from the computer.

DISCLOSURE OF INVENTION

The above and other needs are met by a method, computer-implemented system, and computer program product in which a security module prevents malicious code from performing malicious activity on a computer by detecting an attempt by the malicious code to remove or modify an uninstaller. An embodiment of the method comprises monitoring installation actions performed to install applications on a computer. The method further includes detecting an installation action being performed to install an application on the computer, where the installation action executes an installer that installs both the application and an uninstaller for uninstalling the application. The method also includes detecting an attempt to remove or modify the uninstaller to render the uninstaller incapable of uninstalling the application. In one embodiment, the method includes intercepting and blocking of the attempt to remove or modify the uninstaller for analysis of the application. In addition, the method comprises analyzing the application for the presence of malicious code responsive to detecting an attempt to remove or modify the uninstaller, and determining that the application being installed on the computer comprises malicious code responsive to the analysis. In one embodiment, the method includes utilizing the uninstaller for the application infected with malicious code to uninstall the application. Similarly, an embodiment of the computer program product comprises a computer-readable storage medium storing executable computer program instructions for performing these steps.

In an embodiment of the system, a monitoring module monitors installation actions performed to install applications on a computer. An installation detection module detects an installation action being performed to install an application on the computer, where the installation action executes an installer that installs the application and installs an uninstaller for uninstalling the application. The installation detection module further detects an attempt to remove or modify the uninstaller to render the uninstaller incapable of uninstalling the application. In one embodiment, the system includes an interception module for intercepting and blocking the attempt to remove or modify the uninstaller. In addition, an analysis module analyzes the application for the presence of malicious code responsive to the detection of an attempt to remove or modify the uninstaller, and a malware management module determines that the application being installed on the computer comprises malicious code responsive to the analysis. In one embodiment, the malware management module is further configured for utilizing the uninstaller for the application infected with malicious code to uninstall the application. The system can also include a computer-readable storage medium that stores these executable software modules, and a processor that executes the software modules stored by the computer-readable storage medium.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
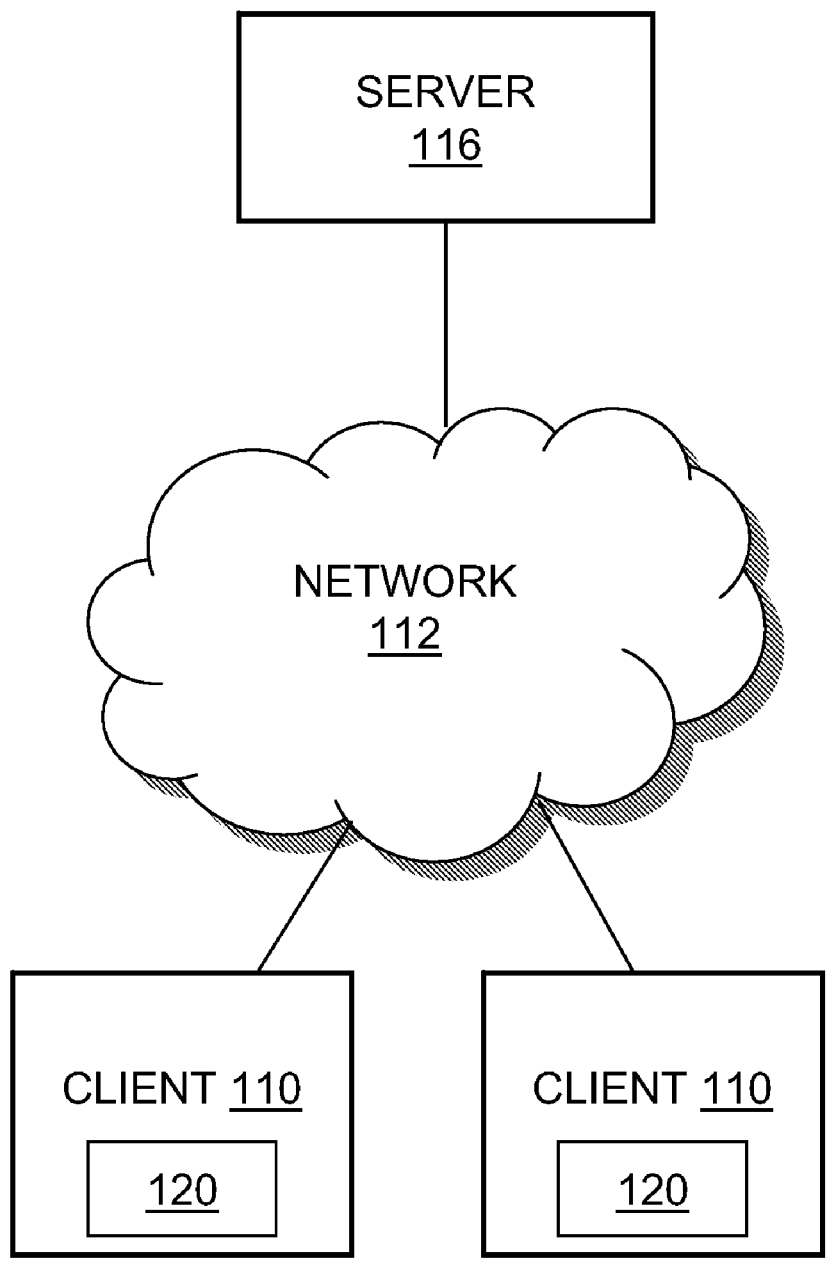
FIG. 1 is a high-level block diagram illustrating an example of a standard computing environment 100, according to one embodiment of the present invention.

FIG. 1 is a high-level block diagram illustrating a computing environment 100 according to an embodiment. FIG. 1 illustrates a server 116 and clients 110 connected by a network 116. Only two clients 110 are shown in FIG. 1 in order to simplify and clarify the description. Embodiments of the computing environment 100 can have thousands or millions of clients 110, as well as multiple servers 116. In some embodiments, the clients 110 are only connected to the network 112 for a certain period of time or not at all.

The server 116 serves information or content to clients 110 via the network 116. In one embodiment, the server 116 is located at a website provided by SYMANTEC CORPORATION, although the server can also be provided by another entity. The server 116 can include a database storing information and a web server for interacting with clients 110. The server 116 can send information stored in the database, such as installation packages including applications or updates to applications for installation on the computer, across the network 112 to the client computers 110.

The clients 110 are computers or other electronic devices used by one or more users 110 that can interact with the server 116 or other clients 110. The clients 110, for example, can be personal computers executing a web browser that allows the user to browse and search for information available at a website associated with the server. In other embodiments, the clients 110 are network-capable devices other than a computer, such as a personal digital assistant (PDA), a mobile telephone, a pager, a television "set-top box," etc. The client computers 110 preferably execute an operating system (e.g., LINUX®, one of the versions of MICROSOFT WINDOWS®, and PALM OS®), which controls the operation of the computer system, and execute one or more application programs. Other entities besides the user can also download information via the network 112. Considering the example given above in which a malicious executable file has gained access to a client computer 110 (e.g., through transmission via email, via USB key, etc.) and the malicious file downloads malware disguised in a standard installation package, the malware can be provided to the client 110 via server 116. In this case, the server 116 may be managed by a malicious entity.

The network 112 enables communications among the entities connected to it. In one embodiment, the network 112 is the Internet and uses standard communications technologies and/or protocols. Thus, the network 112 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 112 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In the embodiment illustrated in FIG. 1, the client computers 110 execute a security module 120 for behaviorally detecting malware. The security module 120 can be a discrete application program, or the module 120 can be integrated into another application program or the client computer's 110 operating system. The security module detects malware designed to evade heuristic detection and to trick users into installing the malware by being packaged in a standard installer. Since the standard installer is recognized as one that typically installs legitimate software, the malware and its installation package can often evade detection. Once the malware is installed and can run on the computer, the malware deletes the uninstaller so that the user cannot later uninstall the malware. The security module prevents malicious action on the computer by detecting the malware based on the malware's behavior in attempting to remove or modify the uninstaller. Since the security module prevented the malware from removing or damaging the uninstaller, the uninstaller is still present on the computer and is still functional. The security module can respond by utilizing the malware's own uninstaller (non-malicious uninstaller from the standard installation package) to uninstall the malware. Thus, the security module can both detect the disguised malware and can remove the malware to prevent it from causing damage to the computer.

Figure 2:
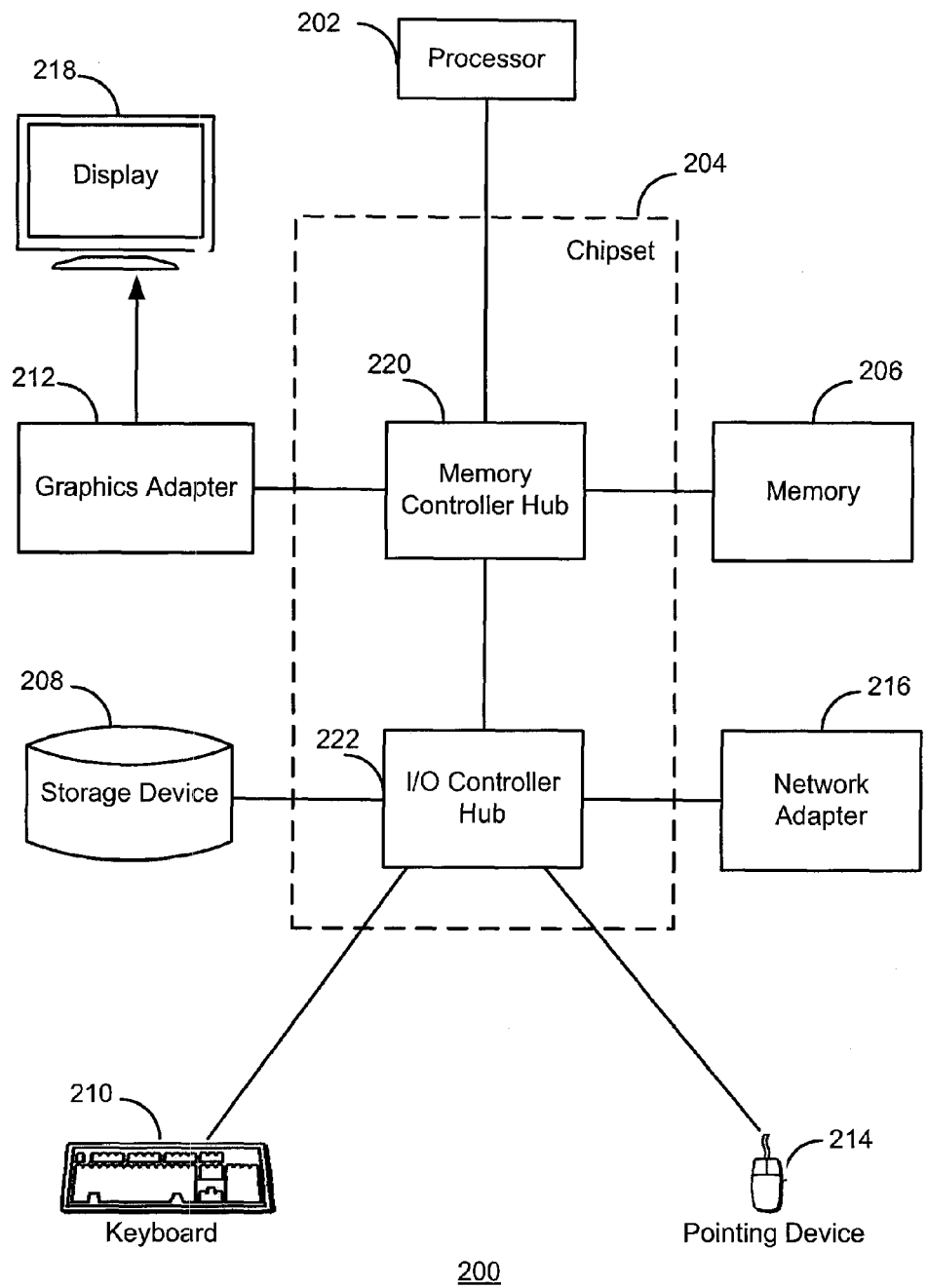
FIG. 2 is a high-level block diagram illustrating a standard computer system 200 for use with the present invention.

FIG. 2 is a high-level block diagram illustrating an example of a computer 200 for use as a server 16 and/or client 110. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 116. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 110 that is a mobile telephone typically has limited processing power, a small display 218, and might lack a pointing device 214. The server 116, in contrast, may comprise multiple blade servers working together to provide the functionality described herein.

Figure 3:
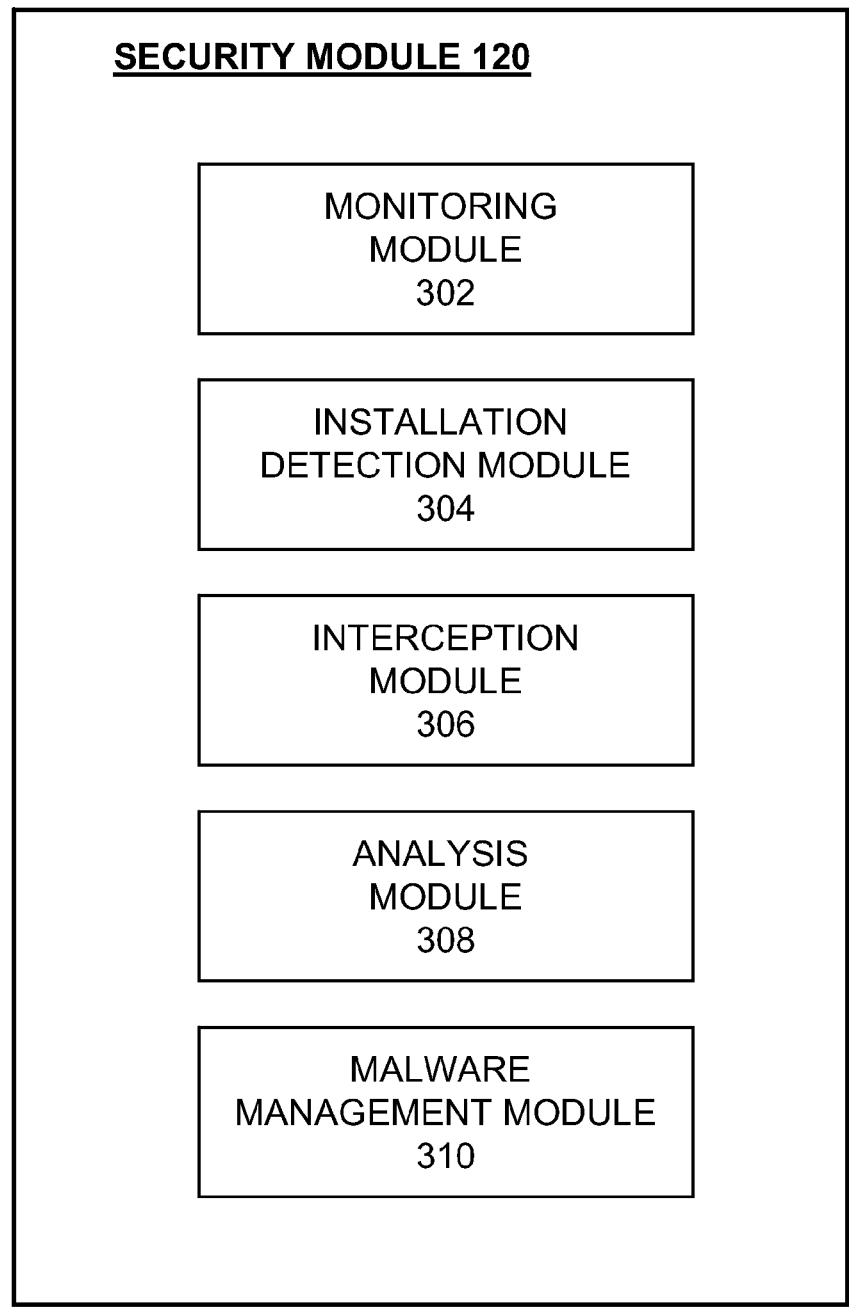
FIG. 3 is a high-level block diagram illustrating the functional modules within the security module 120, according to one embodiment of the present invention.

FIG. 3 is a high-level block diagram illustrating the functional modules within the security module 120, according to one embodiment of the present invention. The security module 120, in the embodiment illustrated in FIG. 3, includes a monitoring module 302, an installation detection module 304, an interception module 306, an analysis module 308, and a malware management module 310. Some embodiments of the security module 120 have different and/or additional modules than those shown in FIG. 3 and the other figures. Likewise, the functionalities can be distributed among the modules in a manner different than described herein. Certain modules and functions can be incorporated into other modules of the security module 120.

The monitoring module 302 monitors installation actions performed to install applications on a computer. The monitoring module 302 reviews and keeps track of actions performed on a computer, and monitors for actions relating to the installation of an application. When an installation occurs, certain actions are typically taken or certain events commonly occur. The module 302 can watch for these types of actions in its monitoring process. For example, the monitoring module can track what application programming interfaces (APIs) are called, what files are being created, modified, stored or deleted, what registry keys are being accessed/modified, what downloads are occurring, and so forth.

The installation detection module 304 detects an installation action being performed to install an application on the computer, the installation action executing an installer that installs both the application and an uninstaller for uninstalling the application. Based on the monitoring provided by the monitoring module 302, the installation detection module 304 can determine when an application is being installed on the computer. There are various actions that can occur on the computer that would result in detection of an installation action by the module 304. For example, certain APIs might be called that are typically associated with installations. Specific files or registry keys that are normally associated with installations could be accessed/modified. The module 304 might detect that a download is occurring, and determine that it is a download of an application. The module 304 might detect that the user is responding to dialog boxes relating to an installation. The module 304 can detect any other action associated with an installation. As an example, when a program is installed, common operations performed include creation or modification of shared and non-shared program files, folders/directories, WINDOWS® registry entries (for a computer running WINDOWS® operating system), configuration file entries, environment variables, links or shortcuts, etc. The module 304 can watch for these and other similar types of actions including actions involving accessing, creating, or modifying directories known to be associated with uninstallers.

The installation detection module 304 further detects an attempt to remove or modify the uninstaller to render the uninstaller incapable of uninstalling the application. The attempt to remove or modify the uninstaller indicates that the application being installed on the computer may include malicious code, since the malware may be trying to prevent itself from being later uninstalled by the user if detected. Installation packages typically include both an installer that is used to install the application, and an uninstaller that can be later used to uninstall the application if it is no longer wanted by the user. When the user wishes to uninstall a program, the user can simply initiate the uninstall process, thus causing the uninstaller to remove the program from the computer. However, malware that has managed to get itself installed on a computer by hiding behind a conventional installer (e.g., MICROSOFT® WINDOWS INSTALLER (MSI), NULLSOFT SCRIPTABLE INSTALL SYSTEM (NSIS), CLICKTEAM, INNOSETUP, WINDOWS INSTALLER XML (WiX), IZPACK, etc.), that is either downloaded with the application or already available on the computer, will want to avoid any possibility of being uninstalled if later detected by the user/computer. Thus, the malware can remove all or part of the uninstaller to avoid its own uninstallation or can modify the uninstaller in a manner that will prevent it from being able to remove the application or from being able to completely/successfully remove the application.

Malware can modify an uninstaller in a number of ways, and each of these attempts at modification can be detected by module 304. The malware can modify the uninstaller to render it incapable of performing any of its uninstallation actions. The malware can also modify the uninstaller so that it can perform some but not all of its uninstallation actions. The modification can prevent the uninstaller from removing any piece of the malware, or can allow the uninstaller to remove some portions of the application, while still preventing it from completely removing the application. The modification can also be designed to damage the uninstaller in some manner so that it cannot function properly. The modification can also be designed so that when the user runs the uninstaller, the uninstaller appears to the user/computer to actually remove the application, but instead the uninstaller leaves some or all of the malware installed on the computer. For example, the modification could modify the installer's log file that tracks which files were installed and could remove several entries for installed files so the uninstaller appears to run, but not all of the malware files are removed. In one embodiment, the attempt to modify the uninstaller changes it such that it crashes when the user attempts execution. In another embodiment, the attempt to modify the uninstaller is an attempt to modify files, registry entries, etc. that are essential to the operation of the uninstaller in uninstalling the application, rather than a modification of the uninstaller executable.

The module 304 can detect an attempt to remove/modify an uninstaller in a number of ways. As one example, the module 304 can monitor which APIs are being called and can look for access of APIs relating to an installation action. As another example, the module 304 can monitor modifications to registry keys related to installation actions. In addition, the module 304 can detect actions associated with the various uninstaller modification examples provided above, including detecting removal/modification of log/data files, uninstaller executable code, registry entries required for uninstallation, and other types of actions that could be associated removal or modification of an uninstaller.

In some embodiments, the module 304 is designed to determine which types of modifications to the uninstaller are valid modifications (e.g., to avoid false positive detections), and which types of modifications are invalid and may be malicious. For example, certain changes to log files or registry entries storing information about names and locations of installed files may be permitted, while others will be determined to be potential malicious actions.

The interception module 306 intercepts and blocks the attempt to remove or modify the uninstaller. As explained above, module 304 detects when an attempt is made to remove or modify the uninstaller, and module 306 intercepts this attempt to prevent the removal/modification. The interception can occur in a number of manners. For example, the system can hook the APIs that might typically be accessed when making changes to the uninstaller. Once one of these APIs is called, the module 306 can intercept the call and prevent the action for which the API was called (e.g., a possible malicious change to the uninstaller). As another example, the module 304 can monitor and detect changes to registry keys associated with the installation/uninstallation of applications. When a modification is made to such a registry key, the interception module 306 can intercept this attempt and prevent the change from occurring. The blocking and intercepting of the attempt to remove or modify the uninstaller by the module 306 allows for analysis of the application by module 308 described below to determine if it is malware.

The analysis module 308 analyzes the application for the presence of malicious code. The analysis module 308 can use one or more methods to analyze the application for malware. For example, the module 308 can use signature-based detection to compare the contents of the application to a dictionary of virus signatures. As another example, the module 308 could use heuristic-based detection to identify unknown viruses by searching the application for virus-like instructions or by executing the program in a virtual environment and logging what actions the program performs. Other known malware detection techniques can be used as well.

The analysis module 308 can perform the analysis by itself or with outside assistance. In one embodiment the analysis module 308 itself has the capability to analyze the application for malware. In another embodiment, the analysis module 308 analyzes the application with the help of other programs on the computer. For example, antivirus or other security software on the computer can be used by the module 308 to analyze the application. The analysis module 308 can interact with one or more of these other security programs for analysis of the possibly malicious application. The module 308 can also send the relevant information to the security programs for performing the analysis and the module 308 can then receive the analysis results.

The malware management module 310 determines that the application being installed on the computer comprises malicious code responsive to the analysis. Based on the analysis provided via the analysis module 308, the module 310 can determine that the application is malware and can prevent the application from performing malicious activity on the computer. The module 310 can prevent malicious activity in a number of ways. The module 310 can quarantine the application to prevent it from taking malicious action. The module 310 can allow other security software to take action to prevent malicious activity. Further, the module 310 itself or other security programs can conduct additional analysis on the malware, store relevant virus signatures, etc. for future use in detecting such malware.

The malware management module 310 can also take action to remove the malware from the computer. In one embodiment, the module 310 utilizes the uninstaller for the application determined to be infected with malicious code to uninstall the application and prevent malicious activity. In this embodiment, the malware's own uninstaller that it was attempting to damage to prevent removal can be used to uninstall the malware. The module 310 can thus initiate the uninstall process using the malware's own installation package that will result in the uninstallation of the malware. Since the malware used a clean installer/uninstaller to disguise itself and since the malware was prevented from damaging the uninstaller as intended, the malware's clean uninstaller can be used to completely remove the malicious files from the computer.

Figure 4:
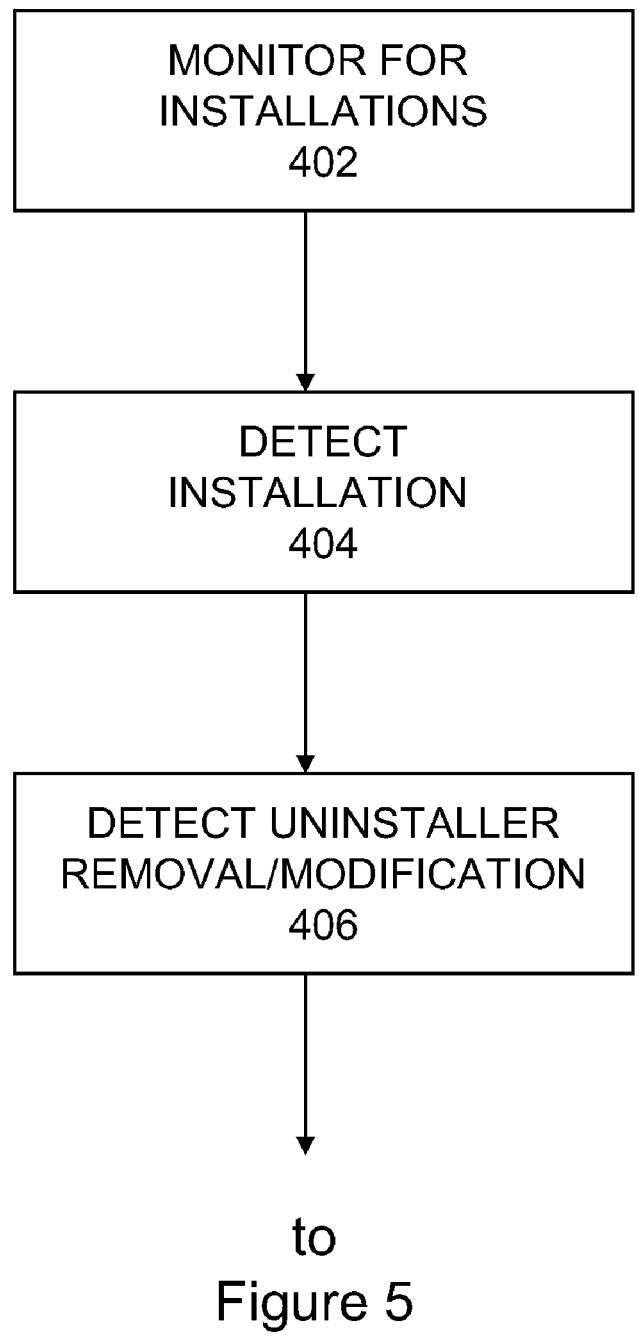
FIG. 4 is a flowchart illustrating steps performed for monitoring and detecting installations, and for detecting attempts at uninstaller modification/removal, according to one embodiment of the present invention.

Referring now to FIG. 4, there is shown a flowchart illustrating the operation of the security module 120, according to some embodiments of the present invention. Specifically, FIG. 4 illustrates the steps of the security module 120 involving monitoring for and detecting installations, and also detecting attempts at uninstaller modification/removal. It should be understood that these steps are illustrative only. Different embodiments of the security module 120 may perform the illustrated steps in different orders, omit certain steps, and/or perform additional steps not shown in FIG. 4 (the same is true for FIG. 5).

As shown in FIG. 4, the security module 120 monitors 402 installation actions performed to install applications on a computer. When an application is installed on a computer, there are a number of common operations that occur. The application often must be "unpacked" from the condensed form in which it is distributed, and the relevant information must be stored in the proper locations. Tests may be run and other configurations or settings of the computer adjusted to ensure the application can operate appropriately. In some cases, the installation simply includes copying of files to the relevant places. Thus, as explained above, the module 120 can track any of these types of installation actions, including what APIs are called, what files are being created, modified, stored or deleted that might be related to an installation, what registry keys are being accessed/modified, what downloads are occurring, whether the user is responding to installation dialog boxes, and other common operations associated with application installations.

The module 120 detects 404 an installation action being performed to install an application on the computer, where the installation action executes an installer that installs both the application and an uninstaller for uninstalling the application. The module 120 can thus detect an installation action when one of the actions described above, for which the module 120 is monitoring, occurs.

The module 120 detects 406 an attempt to remove or modify the uninstaller to render the uninstaller incapable of uninstalling the application. The attempt to remove or modify the uninstaller can be an attempt to damage the uninstaller so it cannot completely uninstall the application or to modify files essential to the operation of the uninstaller. The attempt can also take on any of the various other forms described in more detail above. The module 120 can detect 406 such an attempt in any of the manners described above, as well. For example, the module 120 can monitor which APIs are called for an installation action or whether attempts are made to modify registry entries associated with installation or uninstallation.

Figure 5:
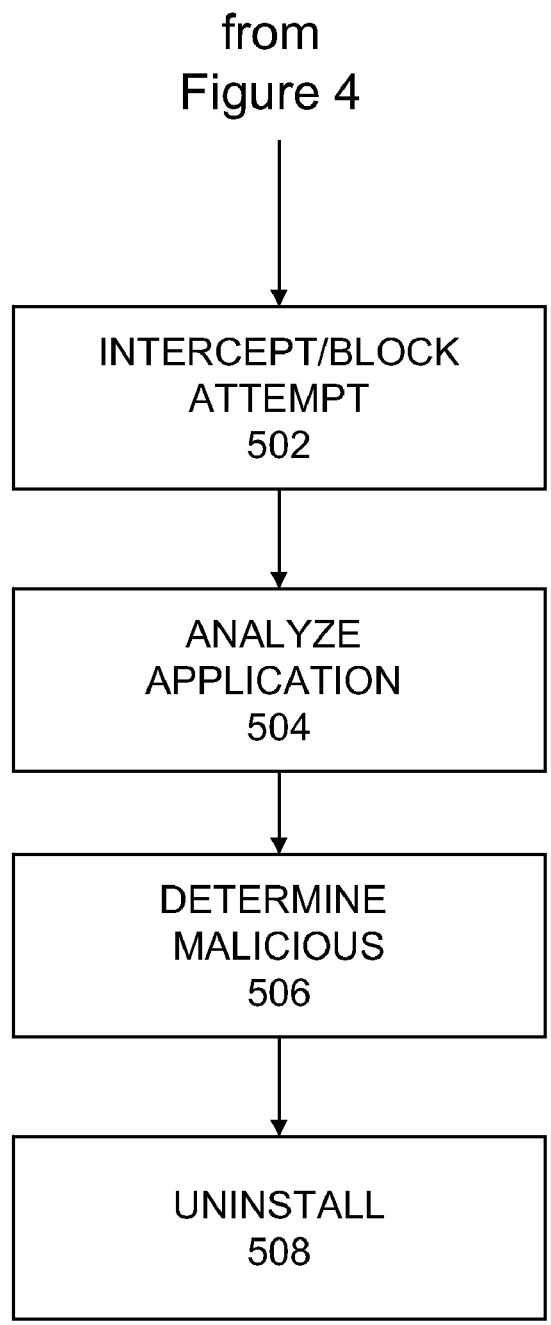
FIG. 5 is a flowchart illustrating steps performed for interception and blocking of attempts to tamper with the uninstaller, analysis of the application, and management of any malware detected, according to one embodiment of the present invention.

Referring now to FIG. 5, there is shown a flowchart illustrating the operation of the security module 120, according to some embodiments of the present invention. Specifically, FIG. 5 illustrates the steps of the security module 120 involving interception and blocking of attempts to tamper with the uninstaller, analysis of the application, and management of any malware detected.

In one embodiment, the module 120 intercepts and blocks 502 the attempt to remove or modify the uninstaller for analysis of the application. Attempts to access or make changes to the uninstaller can thus be stopped before the uninstaller is damaged or removed.

The module 120 analyzes 504 the application for the presence of malicious code. The module 120 can use any of the known techniques for malware analysis and/or can allow security programs installed on the computer to analyze 504 the application.

The module 120 determines 506 that the application being installed on the computer comprises malicious code in response to the analysis 504. The module 120 can respond to the determination accordingly, preventing the application from conducting malicious activity on the computer. In one embodiment, the module 120 utilizes 508 the uninstaller for the application determined to be infected with malicious code to uninstall the application and prevent malicious activity.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

We claim:

1. A non-transitory computer-readable storage medium storing executable computer program instructions for malicious code detection based on uninstaller modification or removal, the computer program instructions comprising instructions for performing steps comprising:
   monitoring installation actions performed to install applications on a computer;
   detecting an installation action being performed to install an application on the computer, the installation action executing an installer that installs the application and installs an uninstaller for uninstalling the application;
   detecting an attempt to remove or modify the uninstaller to render the uninstaller incapable of uninstalling the application, the attempt to remove or modify the uninstaller indicating possible presence of malicious code;
   intercepting and blocking the attempt to remove or modify the uninstaller of the application;
   responsive to detecting an attempt to remove or modify the uninstaller, determining whether the application being installed on the computer comprises malicious code; and
   responsive to the determination that the application being installed on the computer comprises malicious code, utilizing the uninstaller for the application to uninstall the application.

2. The computer-readable storage medium of claim 1, wherein detecting of the attempt to remove or modify the uninstaller further comprises monitoring which application programming interfaces are called for a given installation action.

3. The computer-readable storage medium of claim 1, wherein detecting of the attempt to remove or modify the uninstaller further comprises monitoring modifications to registry keys related to installation actions.

4. The computer-readable storage medium of claim 1, wherein the attempt to remove or modify the uninstaller comprises an attempt to damage the uninstaller so it cannot function to completely uninstall the application.

5. The computer-readable storage medium of claim 1, wherein the attempt to remove or modify the uninstaller comprises an attempt to modify files essential to the operation of the uninstaller in uninstalling the application.

6. A computer-implemented method of malicious code detection based on uninstaller modification or removal, the method comprising:
   monitoring installation actions performed to install applications on a computer;
   detecting an installation action being performed to install an application on the computer, the installation action executing an installer that installs the application and installs an uninstaller for uninstalling the application;
   detecting an attempt to remove or modify the uninstaller to render the uninstaller incapable of uninstalling the application, the attempt to remove or modify the uninstaller indicating possible presence of malicious code;
   intercepting and blocking the attempt to remove or modify the uninstaller of the application;
   responsive to detecting an attempt to remove or modify the uninstaller, determining whether the application being installed on the computer comprises malicious code; and
   responsive to the determination that the application being installed on the computer comprises malicious code, utilizing the uninstaller for the application to uninstall the application.

7. The method of claim 6, wherein detecting of the attempt to remove or modify the uninstaller further comprises monitoring which application programming interfaces are called for a given installation action.

8. The method of claim 6, wherein detecting of the attempt to remove or modify the uninstaller further comprises monitoring modifications to registry keys related to installation actions.

9. The method of claim 6, wherein the attempt to remove or modify the uninstaller comprises an attempt to damage the uninstaller so it cannot function to completely uninstall the application.

10. The method of claim 6, wherein the attempt to remove or modify the uninstaller comprises an attempt to modify files essential to the operation of the uninstaller in uninstalling the application.

11. A computer system for malicious code detection based on uninstaller modification or removal, the system comprising:
   a non-transitory computer-readable storage medium storing executable software modules, comprising:
      a monitoring module for monitoring installation actions performed to install applications on a computer;
      an installation detection module for detecting an installation action being performed to install an application on the computer, the installation action executing an installer that installs the application and installs an uninstaller for uninstalling the application;

the installation detection module for:

detecting an attempt to remove or modify the uninstaller to render the uninstaller incapable of uninstalling the application, the attempt to remove or modify the uninstaller indicating possible presence of malicious code; and intercepting and blocking the attempt to remove or modify the uninstaller of the application;

an analysis module for determining whether the application being installed on the computer comprises malicious code responsive to the detection of an attempt to remove or modify the uninstaller;

a malware management module for utilizing the uninstaller for the application to uninstall the application responsive to determination that the application being installed comprises malicious code; and a computer processor configured to execute the software modules stored by the non-transitory computer-readable storage medium.

12. The system of claim 11, wherein the installation detection module is further configured for monitoring which application programming interfaces are called for a given installation action.

13. The system of claim 11, wherein the installation detection module is further configured for monitoring modifications to registry keys related to installation actions.

14. The system of claim 11, wherein the attempt to remove or modify the uninstaller comprises an attempt to damage the uninstaller so it cannot function to completely uninstall the application.

15. The computer-readable storage medium of claim 1, wherein detecting the attempt to remove or modify the uninstaller further comprises:

monitoring actions involving accessing, creating or modifying directories associated with the uninstaller.

16. The computer-readable storage medium of claim 1, wherein detecting the attempt to remove or modify the uninstaller further comprises:

determining which types of detected modifications to the uninstaller are valid modifications.

* * * * *